United States Patent [19]

House

[11] 4,083,827
[45] Apr. 11, 1978

[54] DIALKYLAMINOBENZALDEHYDE POLYPYRROLIDONE COMPOSITION

[75] Inventor: Ralph House, El Sobrante, Calif.

[73] Assignee: Chevron Research Company, San Francisco, Calif.

[21] Appl. No.: 727,839

[22] Filed: Sep. 29, 1976

[51] Int. Cl.$^2$ ............................................... C08K 5/18
[52] U.S. Cl. ........................... 260/45.9 QA; 260/78 P
[58] Field of Search ...................... 260/45.9 QA, 78 P

[56] References Cited

U.S. PATENT DOCUMENTS

| | | | |
|---|---|---|---|
| 3,017,393 | 1/1962 | Ney | 260/78 P |
| 3,026,301 | 3/1962 | Ney | 260/78 P |
| 3,052,654 | 9/1962 | Roth et al. | 260/78 P |
| 3,072,615 | 1/1963 | Riedesel | 260/78 P |

FOREIGN PATENT DOCUMENTS 932,066   7/1963   United Kingdom ........... 260/45.9 R

OTHER PUBLICATIONS

Encyclopedia of Polymer Science & Technology (vol. 10), pp. 423 & 464, (Interscience), (N.Y.), (1969).
Wagner et al., Chem. Abs. 63, 584of (1965).
Matveeva et al., Chem. Abs. 72, 91196u (1970).

*Primary Examiner*—Melvyn I. Marquis
*Assistant Examiner*—H. H. Fletcher
*Attorney, Agent, or Firm*—Dix A. Newell; Lawrence S. Squires

[57] ABSTRACT

The dialkylaminobenzaldehydes are thermal stabilization additives for solid polypyrrolidone at melt temperatures.

4 Claims, No Drawings

DIALKYLAMINOBENZALDEHYDE POLYPYRROLIDONE COMPOSITION

BACKGROUND OF THE INVENTION

Poly-2-pyrrolidone is the source of a useful synthetic fiber for the textile industry. The melt-spinnable white solid polymer is produced by the alkaline-catalyzed polymerization of 2-pyrrolidone in the presence of carbon dioxide (see U.S. Pat. No. 3,721,652). Polypyrrolidone so produced is melt-spun into filaments by extrusion from multi-hole spinnerets. In melt-spinning, the polymer composition is extruded in a molten condition at a melt temperature which is generally greater than about 270° C, and extruder temperatures, i.e., extruder screw barrel temperatures, of about 280° C and higher. The extrusion must be carried out with care because of the tendency of the polymer to thermally degrade and revert to monomer. Degradation produces an unacceptable extrudate containing foam or bubbles. If extrusion is attempted at an appreciably lower temperature to avoid thermal decomposition, or at a higher extruder screw rpm to decrease residence time at the extruder temperature, excessive torque must be developed in the extruder screw, the screw barrel temperature increases further, and the pressure at the spinneret increases and may fluctuate to yield an inconsistent product. Consequently, in order to melt extrude polypyrrolidone efficiently, one may either seek to increase the thermal stability of the polymer, or to improve the extrudability of the polymeric composition, by use of additives.

SUMMARY OF THE INVENTION

The thermal stability of poly-2-pyrrolidone at melt temperature is appreciably improved by the addition of dialkylaminobenzaldehydes. The poly-2-pyrrolidone composition comprises a major amount of normally solid poly-2-pyrrolidone and a thermal stabilizing amount of dialkylaminobenzaldehyde.

DESCRIPTION OF PREFERRED EMBODIMENTS

A useful synthetic fiber is produced by the melt extrusion at extruder temperatures in excess of about 270° C of a composition comprising a major amount of polypyrrolidone produced by the alkaline-catalyzed polymerization of 2-pyrrolidone in the presence of carbon dioxide and a minor amount of dialkylaminobenzaldehyde. The addition of dialkylaminobenzaldehyde in amount of 0.5–5 weight percent to polypyrrolidone appreciably improved its thermal stability. That is, it appreciably inhibits the degradation of the polymer to monomer at melt temperature.

The dialkylaminobenzaldehydes of the present invention are di($C_1$–$C_{12}$alkyl)aminobenzaldehydes such as dimethyl-, diethyl-, dipropyl-, di t-butyl-, diisopropyl-, dihexyl-, didecyl-, methylethyl-, decylmethyl-, methyl t-butyl-, etc. etc. aminobenzaldehydes. The dialkylaminobenzaldehydes are p-, o- or m-dialkylaminobenzaldehydes. The preferred dialkylaminobenzaldehydes are di($C_1$–$C_5$alkyl)aminobenzaldehydes and dimethylaminobenzaldehyde is most preferred. These compounds may be used alone or in combination, or in mixtures of various reasonably available geometric and/or substitutional isomers since all such geometric and substitutional isomers are within the scope of the present invention.

The "normally solid" poly-2-pyrrolidone of the present invention is polypyrrolidone having a weight average molecular weight in excess of about 5,000 and preferably in excess of about 50,000. The dialkylaminobenzaldehyde is normally added to the solid polypyrrolidone by coating pellets of the polymer with the additive before extrusion, but any convenient method may be used.

Thermal stabilization of polypyrrolidone is determined, among other methods, by the measurement of weight loss by the polymer on a Mettler hot-stage at 269° C over a period of five minutes, with and without the presence of the dialkylaminobenzaldehyde. The monomer produced by this heat treatment is completely removed by extraction with water. The difference in weight between the starting polymer and the dry extracted polymer is the weight loss. At the additive level of 1 weight percent of dialkylaminobenzaldehyde, based on polypyrrolidone, the additive improved the thermal stability of the polymer by more than about 20 percent compared to an unstabilized sample, as shown in the following table.

TABLE

| Additive, % | Weight Loss, % | Effect on Weight Loss, % |
|---|---|---|
| None | 14.5 | — |
| p-dimethylaminobenzaldehyde, 0.2 | 21.9 | +51 |
| p-dimethylaminobenzaldehyde, 1.0 | 10.9 | −25 |
| p-dimethylaminobenzaldehyde, 5.0 | 12.2 | −16 |

What is claimed is:

1. A composition of matter comprising a major amount of normally solid poly-2-pyrrolidone and a thermal stabilizing amount, effective to reduce the thermal degradation of said poly-2-pyrrolidone to its monomer, in the range of from about 0.5 weight percent to about 5 weight percent of said composition, of a N-alkyl-N-alkyl-aminobenzaldehyde.

2. A composition of matter according to claim 1 wherein said N-alkyl-N-alkyl-aminobenzaldehyde is a N-($C_1$–$C_{12}$alkyl)-N-($C_1$–$C_{12}$alkyl)-aminobenzaldehyde.

3. The composition of matter of claim 1 wherein said N-alkyl-N-alkyl-aminobenzaldehyde is p-dimethylaminobenzaldehyde.

4. In the extrusion of polypyrrolidone, the improvement which comprises extruding a composition comprising a major amount of normally solid poly-2-pyrrolidone and a thermal stabilizing amount, effective to reduce the thermal degradation of said poly-2-pyrrolidone to its monomer, in the range of from about 0.5 weight percent to about 5 weight percent, of said composition, of an N-alkyl-N-alkyl-aminobenzaldehyde.

* * * * *